B. R. BRIERLY & E. H. WAUGH.
FISH BEHEADING DEVICE.
APPLICATION FILED JAN. 26, 1916.
1,222,926.
Patented Apr. 17, 1917.
4 SHEETS—SHEET 1.
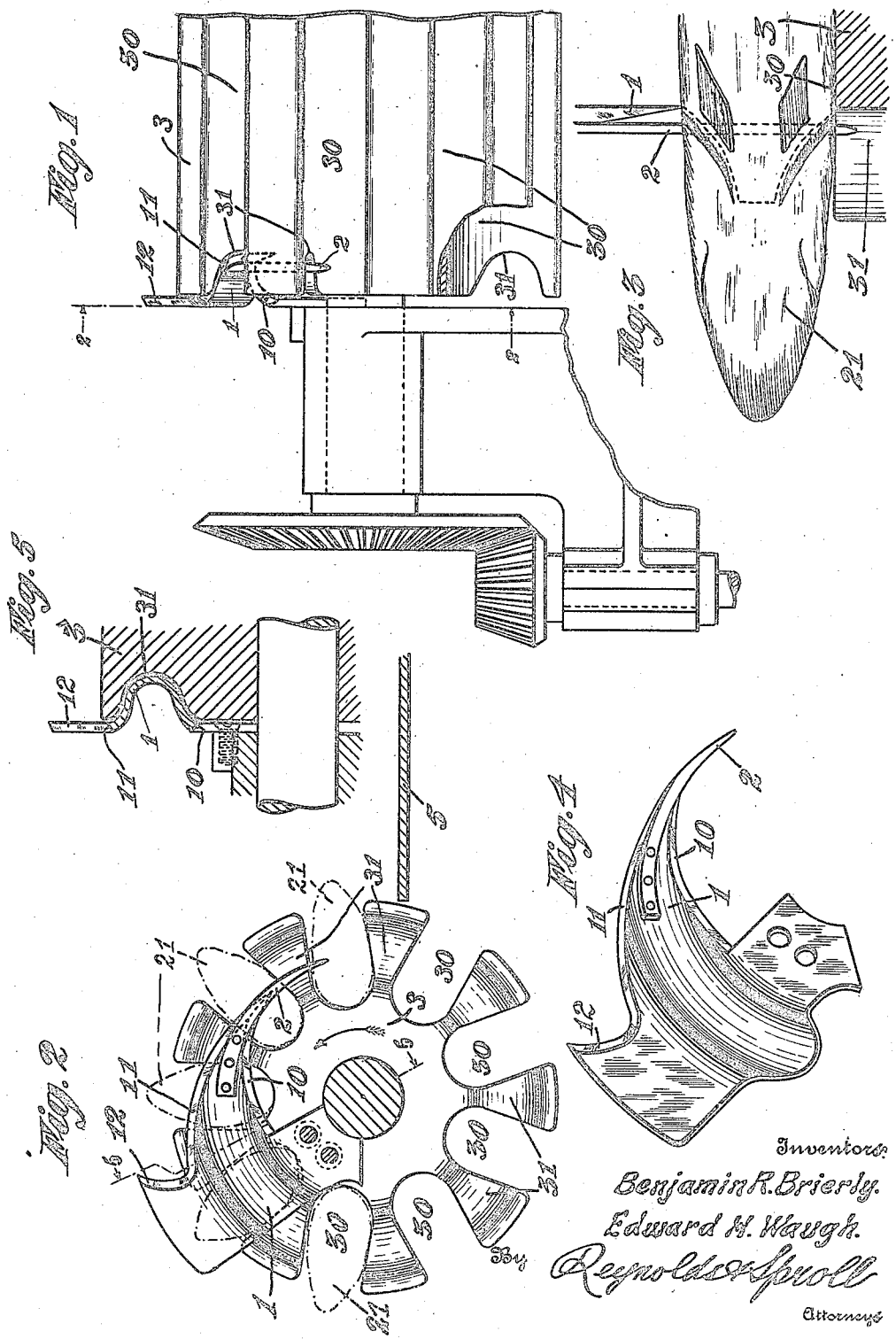

B. R. BRIERLY & E. H. WAUGH.
FISH BEHEADING DEVICE.
APPLICATION FILED JAN. 26, 1916.
1,222,926.
Patented Apr. 17, 1917.
4 SHEETS—SHEET 2.
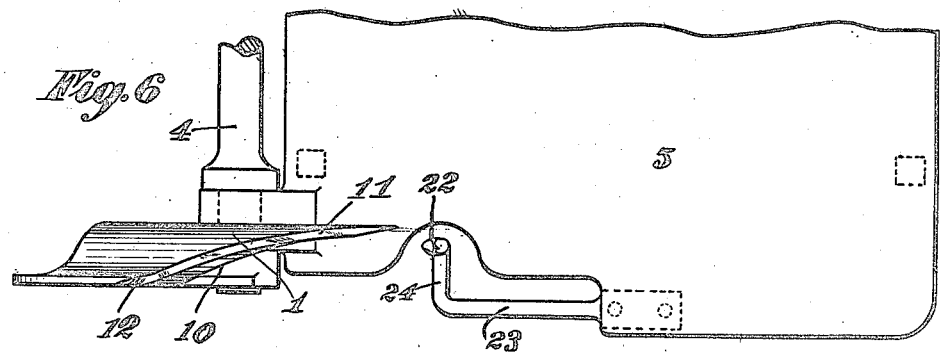
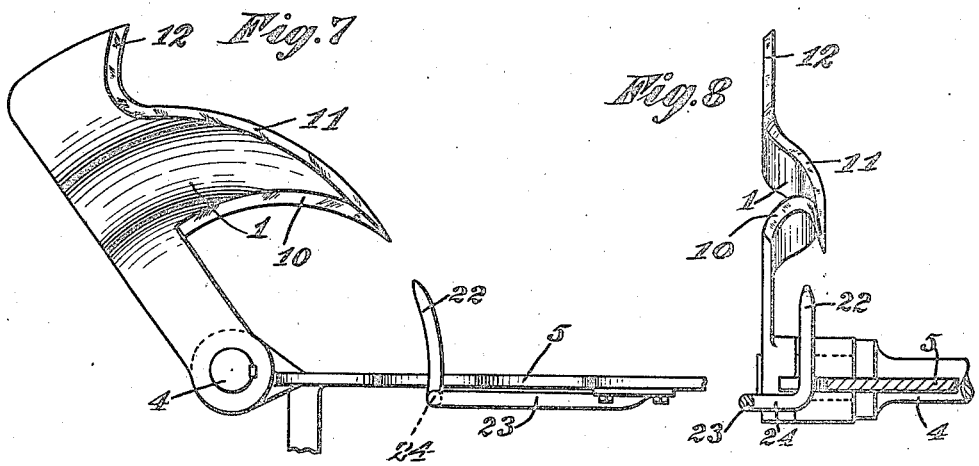
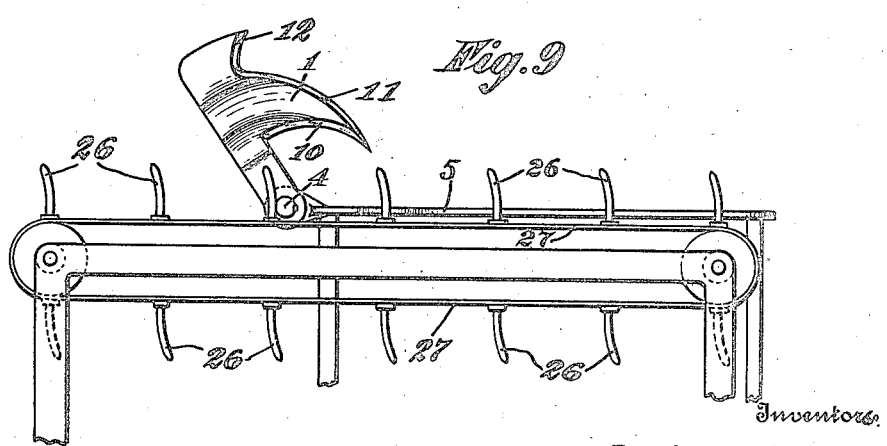
Inventors
Benjamin R. Brierly.
Edward H. Waugh.
By Reynolds & Sproull
Attorneys

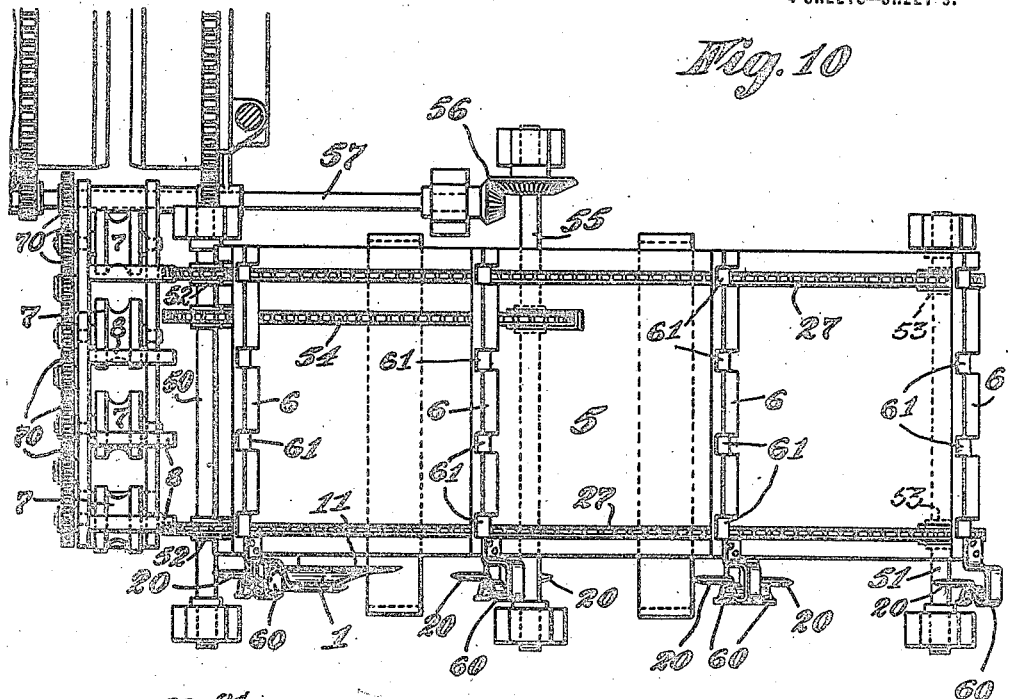
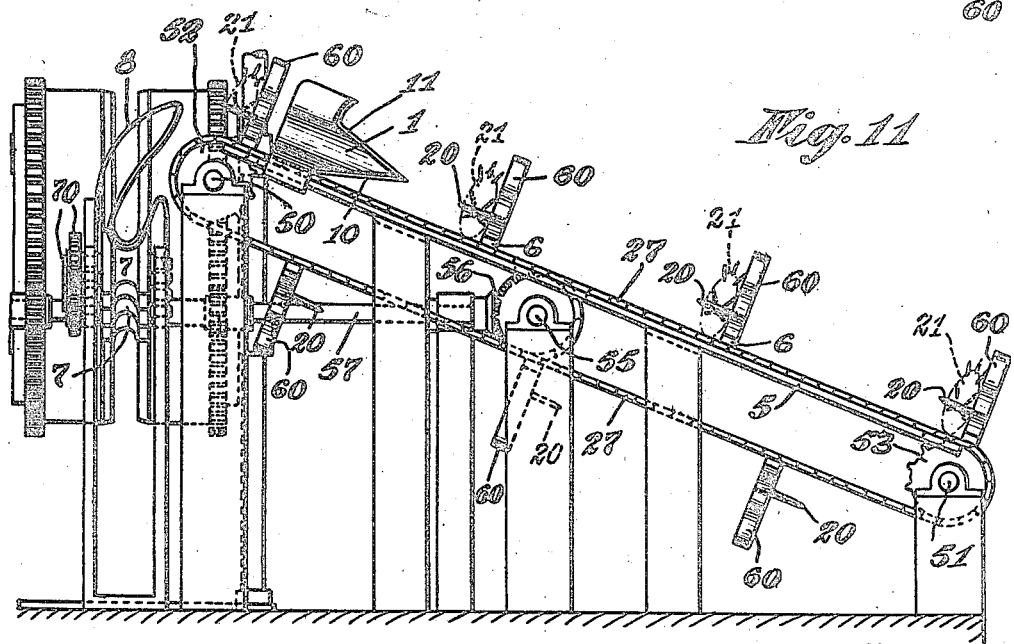

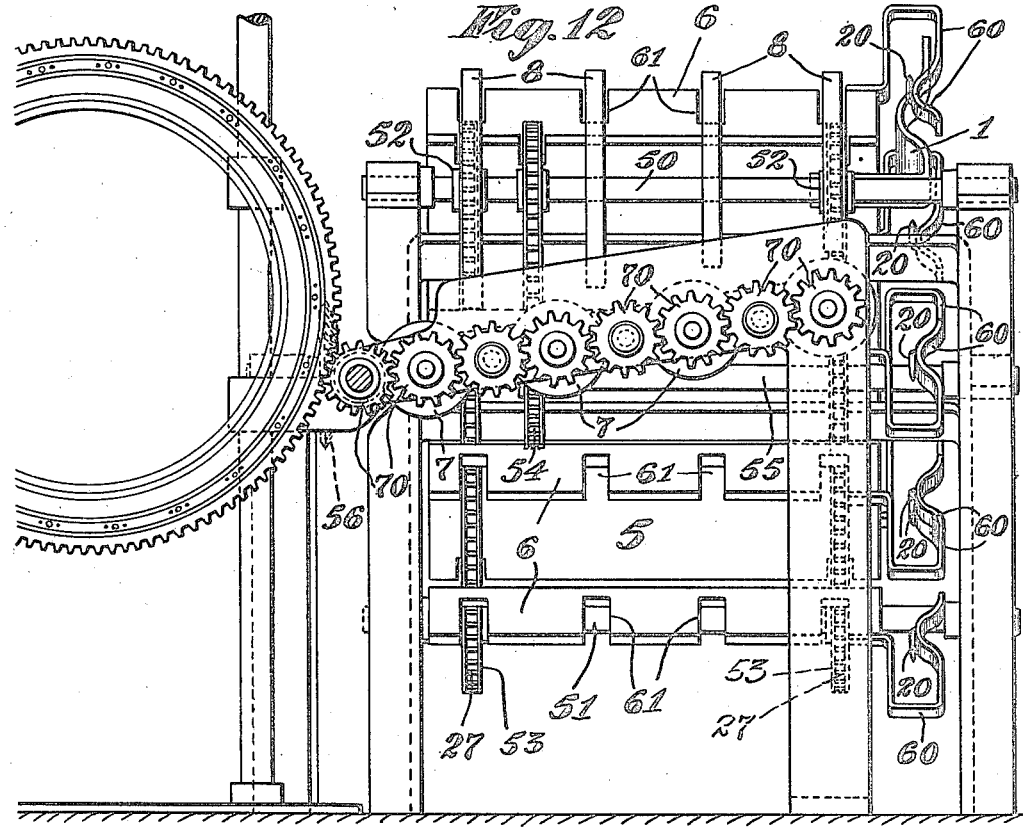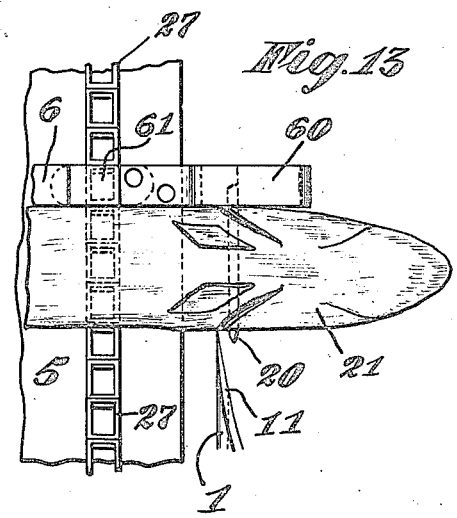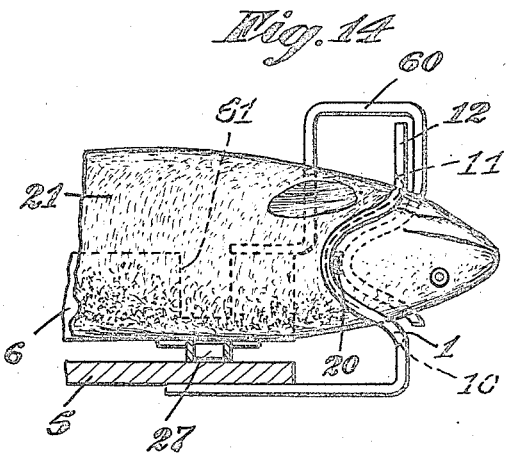

UNITED STATES PATENT OFFICE.

BENJAMIN R. BRIERLY AND EDWARD H. WAUGH, OF SEATTLE, WASHINGTON, ASSIGNORS TO SMITH CANNERY MACHINES COMPANY, OF SEATTLE, WASHINGTON, A CORPORATION OF WASHINGTON.

FISH-BEHEADING DEVICE.

1,222,926.          Specification of Letters Patent.          Patented Apr. 17, 1917.

Application filed January 26, 1916. Serial No. 74,438.

*To all whom it may concern:*

Be it known that we, BENJAMIN R. BRIERLY and EDWARD H. WAUGH, citizens of the United States, and residents of the city of Seattle, county of King, State of Washington, have invented certain new and useful Improvements in Fish-Beheading Devices, of which the following is a specification.

Our invention relates to fish dressing or cleaning machines and more particularly to the mechanism employed in handling the fish during the beheading operation. One of the special features of this invention lies in the combination of the beheading knife with a pin which is used for properly registering the fish, so as to automatically secure the proper relation between the position of the fish and the position occupied by the knife. Other features of our invention relate to the apparatus for handling the fish in presenting them to the beheading knife.

A principal object of our invention is to automatically secure a more perfect registering between the fish and the beheading knife, whereby is secured the clean and complete removal of the gills and enough of the bony growth which lies immediately back of the gills to insure complete removal of the parts thereof to which the forward end of the entrails are secured and to open the forward end of the blood sac which lies along the back bone, so that this sac may be more easily and effectively cleaned out.

Our invention consists of the novel parts and the combinations thereof which will be particularly defined in the claims. In the accompanying drawings we have shown our invention embodied in the forms of construction which are now most preferred by us.

Figure 1 illustrates our invention as applied to one particular type of fish dressing machine.

Fig. 2 is an end view of the same type of apparatus.

Fig. 3 is a diagrammatic figure illustrating the manner in which our improvement acts upon the fish in beheading the same.

Fig. 4 is a side view of the knife and registering pin as shown in the preceding figures.

Fig. 5 is a cross section of the beheading knife and the parts which coöperate with this during the act of removing the fish head.

Fig. 6 shows in plan view a similar type of knife but with the fish registering pin mounted separately from the knife.

Fig. 7 is a side elevation of the mechanism shown in Fig. 6.

Fig. 8 is a similar elevation, but taken from a view at right angles to that of Fig. 7.

Fig. 9 is an elevation of a modified form of construction in which the fish registering pins are mounted upon an endless movable belt or chain.

Fig. 10 is a plan view of the apparatus for presenting the fish to the knife and for discharging the beheaded fish therefrom in the form of construction now most preferred by us.

Fig. 11 is an elevation of the same construction.

Fig. 12 is an end view of the same mechanism viewed from the left hand end of the device as shown in Figs. 10 and 11.

Fig. 13 is a detail showing in top view a fish placed on the presenting mechanism.

Fig. 14 is a detail showing a side view of the same parts.

The type of knife herein illustrated is, in general, of the same type as that which has previously been employed for like service.

The main portion of the blade 1 is of concave or rounded cross section, as is clearly shown in Fig. 5. The cutting edges 10 and 11 converge to a point. Where the knife is itself mounted to rotate, or where the knife is stationary and the fish is carried through a circular path, the axis of the knife will be an arc of a circle, as has herein been shown, although if the relative movement between the knife and the fish was in a straight line the axis of the knife would correspondingly become a straight line.

In Figs. 1 to 9 inclusive we have shown the knife as applied to a fish dressing apparatus, wherein the relative movement between the knife and fish is an arc of a circle. In these figures the longitudinal axis of the knife is therefore an arc of a circle. In Figs. 10 to 14 inclusive, where the beheading operation is produced by a straight line movement, the knife is straight in the direction of the beheading movement. The knife is curved in cross section in all cases, to conform to the outline of the fish's gills.

In a knife of this character the two cutting edges 10 and 11 are approximately arcs of circles which intersect at the point. One of these cutting edges is provided with an extension 12 which curves backward, as is clearly shown in Fig. 4. This latter portion of the cutting edge is intended to cut from the gills to the edge of the fish.

We have found in the practical use of a knife of this character, that while it effectively severs the head from the fish, it at times fails to satisfactorily cut far enough back of the bony growth, which extends along the rear margin of the fish gills. When this happens it is necessary to have this edge trimmed by hand, and it is our present desire to insure that this bony growth and all parts attached thereto including the gills and the forward attachment of the entrails, be removed with certainty by the same apparatus which removes the head of the fish. To insure this, we have employed a fish registering pin which secures uniform and accurate positioning of the fish and have so located this with relation to the path of movement of the cutting edge of the knife that the cutting edge of the knife will pass immediately to the rear of the gills. One reason why the thorough removal of this bony or gristly growth which borders the rear margin of the gills is so desirable, is that the fish gullet is secured thereto and unless this gristly or bony growth is removed, a fragment of the gullet is left and must be removed by hand. Further, a clean removal of this gristly growth opens the blood sac which lies along the back bone so that the subsequent steps of the cleaning operation may effectively remove the clotted blood.

In the form of construction shown in Figs. 1 to 5 inclusive, the fish registering pin 2 has been shown as mounted upon the knife itself, while in the remaining figures the corresponding pin has been shown as separate from the knife. We will first describe the type of construction shown in Figs. 1 to 5 inclusive.

In this type of construction the pin 2 is curved to correspond with the arc of curvature which is produced, either by the movement of the knife in such cases where the knife rotates and the fish are stationary, or the arc of movement of the fish in such cases where the knife is stationary and the fish are moved through a curved arc to the knife. In the type of construction shown in Figs. 1 and 2 the latter condition exists, that is, the knife is held stationary and the fish are moved through an arc of a circle to the knife. The mechanism illustrated in these figures consists of a rotating drum 3 having recesses 30 into each of which a fish is placed. The end face of this drum is provided with curved grooves conforming to the curvature of the knife so that the cutting edge of the knife is brought into close registry with the edge of the fish holding drum.

The fish registering pin 2 is intended to enter and pass through the gills of the fish. Its point is not made sharp or of such a character as to pierce the fish, but rather of a rounded or dull character, so that it will not readily pierce the fish. The fish are placed in the drum 3 in such position as to bring the gills into approximate registry with the curved edge 31 which coöperates with the knife.

The finger 2 is slightly off-set from the cutting edge of the knife, as is clearly shown in Fig. 3. The reason for this is that the finger 2 is intended to enter the gill openings and the cutting is desired sufficiently in the rear of the gill openings to insure complete removing of the gills and the bony or gristly growth which extends along the rear margin thereof. If the fish has not been placed by hand in the exact position desired, the point of the pin 2 will move the fish slightly in whichever direction is necessary to permit the finger to enter the gill opening, thus insuring exact registry of the fish before the knife edge is brought into action.

Where the pin is made separate from the knife, or as is shown in Figs. 6 to 14 inclusive, the fish are placed upon the pins, that is, so that the pins project into or through the gill openings. The knife is then passed close along the side, edge of the pins. In the construction shown in Figs. 6, 7 and 8 the knife 1 is mounted upon a rotating shaft 4 and the fish are placed upon a stationary table 5. In this construction the pin 22 is mounted upon an arm 23 which has an offset end 24 from which the working part 22 of the pin extends upwardly. This construction is necessitated in order to provide a suitably shaped recess for the passage of the knife.

In the construction shown in Fig. 9 the pins 26 are mounted upon an endless traveling belt 27, a stationary table 5 being used and the knife 1 rotating with the shaft 4.

In the constructions shown in Figs. 10 to 14 the pins are mounted upon an endless traveling belt and the knife is fixed. The knife is also placed within that portion of the travel of the belt or chain 27, which is straight, therefore the axis of the knife is straight. Also the power for effecting the cutting is communicated through the chain belt.

The belt travels over a table or plane 5 and has bars 6 secured thereto and projecting upward enough to provide a support and transporting member for the fish. These bars also have fingers 60 secured to one end and bent in such manner that they first extend over the top of the knife 1 and then down close alongside the outer surface of the knife, as is clearly shown in Fig. 14. These furnish a firm support for the fish head. The curvature of the outer end of this bar should conform to that of the knife. This bar 60 carries the fish centering or registering pin 20.

The relative position of the cutting edge of the knife and the registering pins 20 is clearly shown in Fig. 13. The knife edge is enough inward from the pin to insure clean and complete removal of the gristly inner margin of the gills, taking with it the gullet attachment.

After the fish passes the knife and as it passes with the chain about the upper sprocket wheels 52, the fish engages the yielding or spring guiding fingers 8 which turn it down upon its back upon the rollers 7 which guide it to the cleaning mechanisms. The rollers 7 are driven through connected gears 70.

By the use of the fish registering or positioning pins, as shown, the accurate presentation of the fish to the beheading knife is insured. In consequence the beheading cut will be at the same point for all fish and this point may be determined by the space existing between the cutting edge of the knife and the pin, to insure clean removal of the gullet attachment and therefore a clean removal of the intestines.

What we claim as our invention is:

1. In a fish dressing apparatus, in combination, a beheading knife, means for producing relative movement of the knife and the fish to behead the fish and a registering pin carried by one of said mechanisms and adapted to enter the fish gills in advance of the action of the knife to thereby correctly register the fish with the knife.

2. The combination with a fish dressing apparatus, of registering pins adapted to enter the fish gills in advance of the action of the knife to thereby register the fish with the knife.

3. In a fish dressing apparatus, the combination with a beheading knife having a cross-sectional outline conforming in the main to the outline of the fish gills, of a fish-registering pin adapted to enter the fish gills and located at the concaved side of the knife.

4. In a fish dressing apparatus, the combination with a beheading knife of a fish-registering pin located at the side of the knife which lies toward the fish's head.

5. In a fish dressing apparatus, the combination with a beheading knife of a fish-registering pin positioned to enter the fish's gills.

6. In a fish dressing apparatus, the combination with a beheading knife having inclined cutting edges meeting to form a point, of a fish-registering pin positioned to lie close alongside the path of travel of the cutting edge of the knife, during the beheading operation.

7. In a fish dressing apparatus, the combination with a beheading knife, of means for accurately registering the fish comprising a registering pin adapted to enter the gills of the fish.

8. In a fish dressing apparatus, the combination with a beheading knife and means for maintaining it in a fixed working position, of a fish-registering pin adapted to enter the fish gills and maintained in a position slightly removed laterally of the cutting edges of said knife.

9. A fish beheading device comprising a beheading knife, fish carrying means, a registering pin, carried by the fish carrying means and adapted to enter the fish's gills and means for producing relative movement between the fish carrying means and the knife to carry the knife and pin close alongside each other in the direction of the length of the pin.

10. A fish presenting apparatus for fish dressing machines comprising a pair of endless chains, bars transversely connecting said chains and serving as means for advancing the fish, a bar extending outwardly of the chain from one end of the transverse bars, then recurved outwardly and back toward the chain, and a fish registering pin carried by the outer end of said latter bar and extending in the direction of the movement of the chain.

Signed at Seattle, Washington, this 27th day of December, 1915.

BENJAMIN R. BRIERLY.
EDWARD H. WAUGH.